US011879477B2

(12) United States Patent
Chen et al.

(10) Patent No.: US 11,879,477 B2
(45) Date of Patent: Jan. 23, 2024

(54) FAN LAMP

(71) Applicant: OPPLE LIGHTING CO., LTD., Shanghai (CN)

(72) Inventors: Zhanhua Chen, Suzhou (CN); Hongwei Chen, Suzhou (CN); Guolong Ni, Suzhou (CN)

(73) Assignee: Opple Lighting Co., Ltd., Shanghai (CN)

( * ) Notice: Subject to any disclaimer, the term of this patent is extended or adjusted under 35 U.S.C. 154(b) by 143 days.

(21) Appl. No.: 17/563,032

(22) Filed: Dec. 27, 2021

(65) Prior Publication Data

US 2022/0120286 A1 Apr. 21, 2022

Related U.S. Application Data

(63) Continuation of application No. PCT/CN2020/119240, filed on Sep. 30, 2020.

(30) Foreign Application Priority Data

Oct. 9, 2019 (CN) ........................ 201921677855.2

(51) Int. Cl.
*F04D 29/36* (2006.01)
*F21V 33/00* (2006.01)

(52) U.S. Cl.
CPC ........ *F04D 29/362* (2013.01); *F21V 33/0096* (2013.01)

(58) Field of Classification Search
CPC .......................... F04D 29/362; F21V 33/0096
See application file for complete search history.

(56) References Cited

U.S. PATENT DOCUMENTS 6,158,964 A 12/2000 Gajewski
10,935,043 B1 * 3/2021 Liu ...................... F04D 29/362
(Continued)

FOREIGN PATENT DOCUMENTS

CN 202772705 U 3/2013
CN 205173002 U 4/2016
(Continued)

OTHER PUBLICATIONS

International Search Report of PCT Application No. PCT/CN2020/093967 dated Aug. 26, 2020 with English translation, (4p).

*Primary Examiner* — Eric J Zamora Alvarez
*Assistant Examiner* — Theodore C Ribadeneyra
(74) *Attorney, Agent, or Firm* — Arch & Lake LLP

(57) ABSTRACT

A fan lamp, including a turntable, an elastic restoring assembly and fan blades, the fan blades are connected with the turntable through the elastic restoring assembly, the elastic restoring assembly includes an upper cover, a lower cover and an elastic member, two ends of the elastic member are connected with the upper cover and the lower cover respectively, the upper cover can rotate relative to the lower cover and drives the elastic member to be deformed elastically, the fan blades are connected with the upper cover, and the turntable is connected with the lower cover; and the upper cover includes a connecting member, the lower cover includes a connection mating member, the upper cover and the lower cover have the same circumferential contour and are both circular.

20 Claims, 3 Drawing Sheets

(56) References Cited

U.S. PATENT DOCUMENTS

| | | | | |
|---|---|---|---|---|
| 2010/0202882 | A1* | 8/2010 | Liu | F04D 29/362 416/214 R |
| 2012/0045331 | A1* | 2/2012 | Villella | F04D 29/36 416/5 |
| 2018/0258946 | A1* | 9/2018 | Zhou | F04D 29/362 |
| 2019/0120247 | A1* | 4/2019 | Conley | F04D 29/364 |
| 2021/0115938 | A1* | 4/2021 | Chen | F21S 8/063 |

FOREIGN PATENT DOCUMENTS

| | | | | | |
|---|---|---|---|---|---|
| CN | 205248924 | U | * | 5/2016 | F04D 25/0646 |
| CN | 107355395 | A | * | 11/2017 | |
| CN | 207935110 | U | | 10/2018 | |
| CN | 207935902 | U | * | 10/2018 | |
| CN | 109114038 | A | | 1/2019 | |
| CN | 208950910 | U | | 6/2019 | |
| CN | 208966693 | U | | 6/2019 | |
| CN | 209261912 | U | | 8/2019 | |
| CN | 210769517 | U | | 6/2020 | |
| WO | 2008144596 | A1 | | 11/2008 | |
| WO | 2019095470 | A1 | | 5/2019 | |

* cited by examiner

FAN LAMP

CROSS-REFERENCE TO RELATED APPLICATIONS

This application is based upon and claims the priority of PCT patent application No. PCT/CN2020/119240 filed on Sep. 30, 2020 which claims priority to the Chinese patent application No. 201921677855.2 filed on Oct. 9, 2019, the entire contents of which are hereby incorporated by reference herein for all purposes.

TECHNICAL FIELD

The present disclosure relates to the field of household appliances, and particularly to a fan lamp.

BACKGROUND

Fan lamps may also provide a blowing function on the basis of an illuminating function, and are popular among consumers. Because the blowing function is a seasonal function, fan blades of a fan are often made into a folding type. Upon the fan being switched on, the fan blades are unfolded by a centrifugal force generated by the rotation of a central spindle of the fan, and upon the fan being switched off, the fan blades retract elastically.

Because a mechanism that controls the elastic retraction of the fan blades may always be lubricated with lubricating oil, the lubricating oil may also be thrown out by the centrifugal force, so as to cause pollution.

SUMMARY

The present disclosure provides a fan lamp.

The present disclosure provides a fan lamp, including a turntable, an elastic restoring assembly and fan blades, the fan blades are connected with the turntable through the elastic restoring assembly, the elastic restoring assembly includes an upper cover, a lower cover and an elastic member, two ends of the elastic member are connected with the upper cover and the lower cover respectively, the upper cover can rotate relative to the lower cover and drives the elastic member to be deformed elastically, the fan blades are connected with the upper cover, and the turntable is connected with the lower cover; and the upper cover includes a connecting member, the lower cover includes a connection mating member, the upper cover and the lower cover have the same circumferential contour and are both circular, the upper cover and the lower cover are fastened through a mating action of the connecting member and the connection mating member to form a closed accommodating space, and the elastic member is arranged in the closed accommodating space.

It is to be understood that the foregoing general description and the following detailed description are exemplary and explanatory only and are not restrictive of the disclosure.

BRIEF DESCRIPTION OF THE DRAWINGS

The accompanying drawings described here are used for further understanding of the present disclosure and constitute one part of the present disclosure. Schematic examples of the present disclosure and the description thereof are used to explain the present disclosure, and do not constitute an improper limitation to the present disclosure. In the drawings.

DETAILED DESCRIPTION

Figure 1:
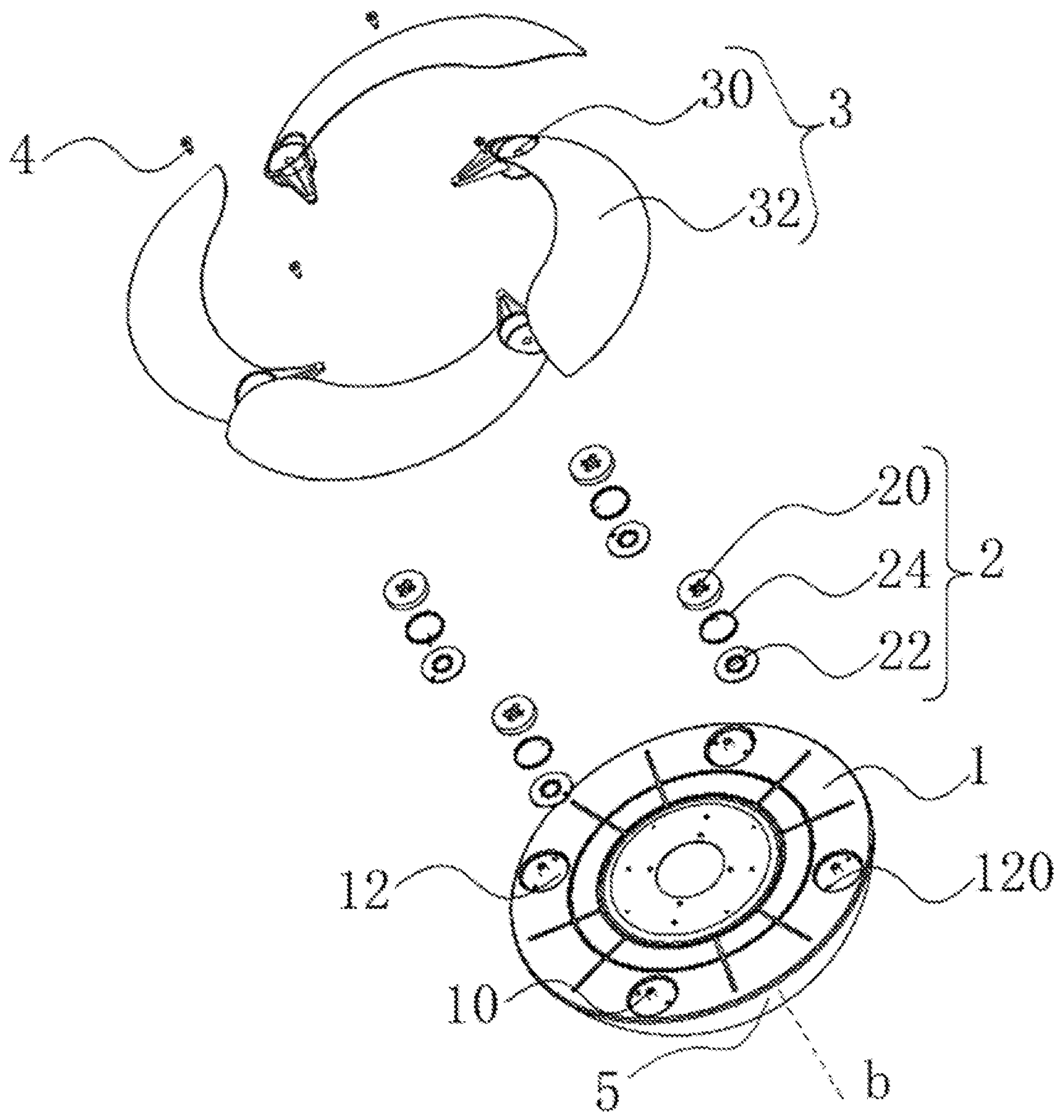
FIG. 1 is a schematic diagram of a fan lamp disclosed by one example of the present disclosure.
Figure 2:
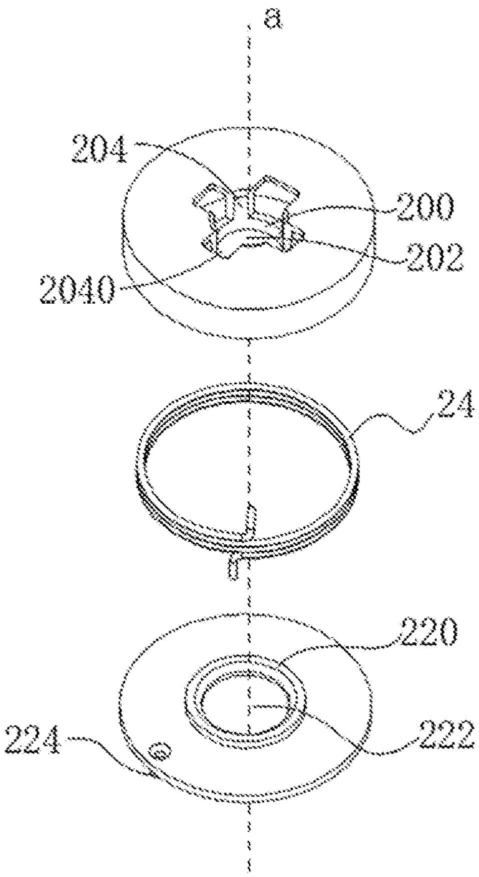
FIG. 2 is a schematic diagram of components of an elastic restoring assembly disclosed by one example of the present disclosure.
Figure 3:
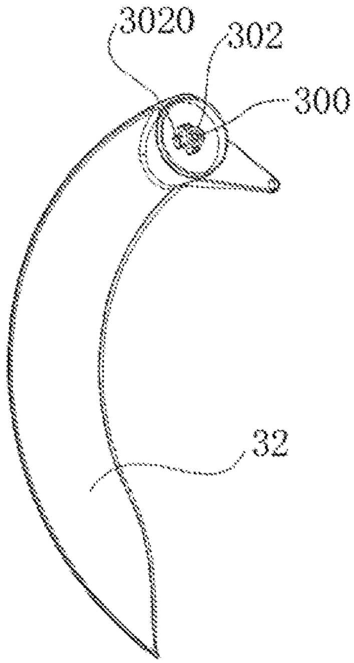
FIG. 3 is a schematic diagram of a fan blade disclosed by one example of the present disclosure.

Examples of the present disclosure will be described below in combination with the accompanying drawings of the present disclosure. Apparently, the described examples are merely a part rather than all the examples of the present disclosure. All other examples that are derived from the examples of the present disclosure by an ordinary skilled in the art without creative efforts shall fall within the protection scope of the present disclosure. The reference numerals in the accompanying drawings are merely used to distinguish different steps in technical solutions from each other, rather than delimiting execution orders of the steps. The specific execution order may be referred to the description in the present disclosure.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

DESCRIPTION OF NUMERALS IN THE DRAWINGS

1—Turntable; 2—elastic restoring assembly; 3—fan blade; 4—connecting assembly; 5—illuminating module; 10—fastener; 12—lower cover connecting seat; 20—upper cover; 22—lower cover; 24—elastic member; 26—through cavity; 30—base; 32—blade; 120—eccentric occlusion member; 200—connecting member; 202—first through hole; 204—mortise; 220—connection mating member; 222—second through hole; 224—first mating member; 300—third through hole; 302—connecting tenon; 2040—tenon groove; 3020—tenon tooth; a—central spindle; b—optical axis.

An example of the present disclosure discloses a fan lamp, which includes a turntable 1, an elastic restoring assembly 2 and fan blades 3, the fan blades 3 are fixed at the turntable 1 through the elastic restoring assembly 2, and the turntable 1 is used to drive the elastic restoring assembly 2 and the fan blades 3 to rotate and provide a centrifugal force for the stretching of the fan blades 3. In the present example, the elastic restoring assembly 2 includes an upper cover 20, a lower cover 22 and an elastic member 24, and two ends of the elastic member 24 are connected with the upper cover 20 and the lower cover 22 respectively. In the present example, the elastic member 24 may be a spring, may also be elastic rubber, etc., can be deformed elastically along with the rotation of the upper cover 20 relative to the lower cover 22, and can make the upper cover and lower cover rotate relative to each other in an opposite direction through the elastic recovery.

As illustrated by FIG. 1, the fan blades 3 are connected with the upper cover 20, and the turntable 20 is connected with the lower cover 22, so that, upon the fan blades 3 being away from the turntable 20 due to the centrifugal force, the fan blades 3 drive the upper cover 20 to rotate relative to the lower cover 22, and make the elastic member 24 deformed elastically; and upon the centrifugal force disappearing, the elastic member 24 drives the fan blades 3 to rotate back to an original position through the elastic recovery. In the present example, the upper cover 20 includes a connecting member 200, the lower cover 22 has a connection mating member 220, and the upper cover 20 and the lower cover 22 are both arranged in a circular shape with the same circumferential contour; the connecting member 200 and the mating member 220 may be concentric annular fasteners as illustrated by FIG. 1, and may also be buckles or combinations of plugs and jacks, as long as the upper cover 20 and the lower cover 22 can be fastened with each other and can rotate freely relative to each other. By adopting the structure, the rotation requirement can be met, and a closed accommodating space may be formed between the upper cover 20 and the lower cover 22 at the same time. The closed accommodating space is used to accommodate the elastic member 24. In this way, liquid such as lubricating oil arranged on the elastic member 24 may be possibly limited in the closed accommodating space instead of being thrown out under the centrifugal force.

According to an example of the present disclosure, the upper cover and the lower cover are used to form a rotatable closed space, the elastic member is received in the closed space, and the fan blades are connected with the turntable through the upper cover and the lower cover, so that the possibility that the lubricating oil is thrown out in the utilization process of the fan can be reduced.

Figure 4:
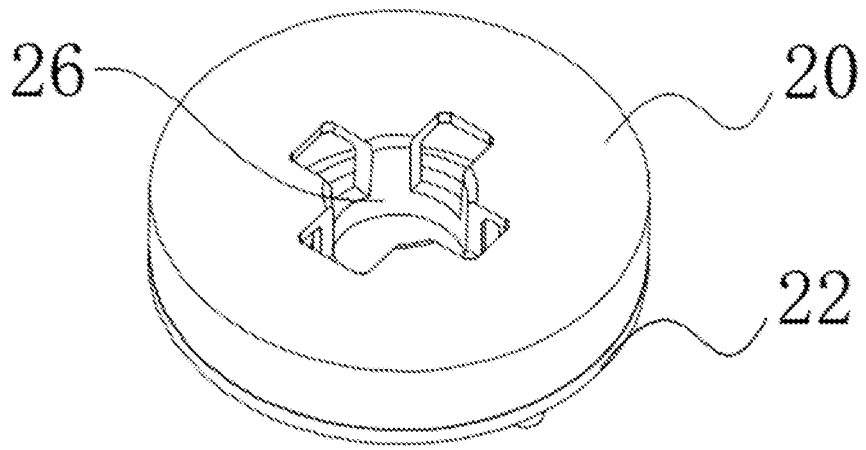
FIG. 4 is a schematic diagram of the elastic restoring assembly disclosed by one example of the present disclosure.

In order to facilitate the installation of the fan blades 3 and turntable 1 to the elastic restoring assembly 2, in the present example, the upper cover 20 includes a first through hole 202, and the lower cover 22 includes a second through hole 222. As illustrated by FIG. 1, the elastic restoring assembly 2 has a central spindle a, and the elastic restoring assembly 2 is circumferentially symmetric around the central spindle a. In order to make the first through hole 202 and the second through hole 222 and internal structures thereof have small internal stress on the elastic restoring assembly 2, in the present example, the first through hole 202 and the second through hole 222 both adopt the central spindle a as a symmetric axis; and moreover, the first through hole 202 and the second through hole 222 may be matched with each other to form a through cavity 26 running through the elastic restoring assembly 2, as illustrated by FIG. 4. In the present example, the fan blades 3 and the elastic restoring assembly 2 are fixed on the turntable 1 by a connecting assembly 4. As illustrated by FIG. 1, the fan blade 3 includes a base 30 and a blade 32; and the base 30 is connected with the upper cover 20 and includes a third through hole 300 as illustrated by FIG. 1. The turntable 1 has a fastener 10 corresponding to the through cavity 26. The connecting assembly 4 passes through the third through hole 300 and the through cavity 26 in sequence and is connected with the fastener 10, so that the turntable 1, the elastic restoring assembly 2 and the fan blade 3 are fixed in an extension direction of the central spindle a. The connecting assembly 4 may be a bolt assembly, a bolt passes through the through structure, and a nut is arranged in the fastener 10; and the connecting assembly may also be a tenon-and-mortise structure, as long as the turntable 1, the elastic restoring assembly 2 and the fan blade 3 can be fixed in sequence, and the above rotating action is allowed to occur.

However, the turntable 1, the elastic restoring assembly 2 and the fan blades 3 are fixed by utilizing the above structure, which may easily cause the problem that the upper cover 20 cannot rotate with the fan blade 3 or the lower cover 2 cannot rotate with the turntable 1. In order to avoid the problem, in the present example, the turntable 1 has a lower cover connecting seat 12 corresponding to the lower cover 22; the lower cover connecting seat 12 has an eccentric occlusion member 120 that is arranged eccentrically; the lower cover 22 has a first mating member 224 corresponding to the eccentric occlusion member 120; the eccentric occlusion member 120 may be configured as an eccentric hole on the lower cover connecting seat 12, and the first mating member 224 is arranged as a corresponding convex column, so that, upon the elastic restoring assembly 2 being fixed to the turntable 1 by the connecting assembly 4, the convex column stretches into the hole and prevents the lower cover 22 from rotating circumferentially; and the eccentric occlusion member 120 and the first mating member 224 may also be arranged as a pair of magnets, as long as the rotation of the lower cover 22 with respect to the turntable 1 can be prevented. The base 30 includes a connecting tenon 302; in order to realize a similar effect for preventing the upper cover 20 from rotating relative to the base 30, the connecting tenon 302 has circumferentially-protruding tenon teeth 3020 as illustrated by FIG. 1; the upper cover 20 has a mortise 204 corresponding to the connecting tenon 302; the mortise 204 has tenon grooves 2040 corresponding to the tenon teeth 3020; upon the connecting tenon 302 being inserted into the mortise 204, the tenon teeth 3020 are inserted into the mortise grooves 2040 and matched with the tenon grooves 2040 to prevent the relative rotation of the upper cover 20 and fan blades 32; and in the present example, a component that prevents the relative rotation and corresponds to upper cover 20 or the lower cover 22 is not limited to the above eccentric occlusion member 120, the connecting tenon 302 or the magnet, etc., and may be any component that can prevent the relative rotation, which is not repeated herein.

To facilitate the manufacturing, the connecting tenon 302 is arranged at the center of the base 30 and adopts the central spindle a as the symmetric axis; and the third through hole 300 runs through the connecting tenon 302, so that the concentric structure is convenient for the manufacturing, and especially the fan blade 3 that is made of a plastic material is easy to demold.

In order to reduce the internal stress and losses caused by dislocation during the installation, in the present example, as illustrated by FIG. 1, a plurality of tenon teeth 3020 are circumferentially protruded out of the connecting tenon 302, and a circumferential size of at least one tenon tooth 3020 is different from the circumferential sizes of other ones of the tenon teeth 3020, so that during the installation, the connecting tenon 302 can only be inserted into the mortise 204 in a unique preset posture.

In the present example, in order to facilitate the fan blades 3 to extend out uniformly when rotating, as illustrated by FIG. 1, the circumferential contour of the turntable 1 is arranged in a circular shape, and a plurality of elastic restoring assemblies 2 and corresponding fan blades 3 are uniformly distributed on the periphery of the turntable 1.

To realize the illuminating function, the fan lamp according to the examples of the present disclosure also has an illuminating module 5, and the fan blades 3 are arranged at an upturned side of the turntable 1; the illuminating module 5 is connected with the turntable 1; and an optical axis b of the illuminating module extends downward, so that, upon the fan lamp being lifted, the fan blades 3 may not block the light emitted from the illuminating module 5.

In conclusion, according to the examples of the present disclosure, the upper cover and the lower cover are used to form the rotatable closed space, the elastic member is received in the closed space, and the fan blades are connected with the turntable through the upper cover and the lower cover, so that the possibility that the lubricating oil is thrown out in the utilization process of the fan can be reduced.

The present disclosure provides a fan lamp, including a turntable, an elastic restoring assembly and fan blades, the fan blades are connected with the turntable through the elastic restoring assembly, the elastic restoring assembly includes an upper cover, a lower cover and an elastic member, two ends of the elastic member are connected with the upper cover and the lower cover respectively, the upper cover can rotate relative to the lower cover and drives the elastic member to be deformed elastically, the fan blades are connected with the upper cover, and the turntable is connected with the lower cover; and the upper cover includes a connecting member, the lower cover includes a connection mating member, the upper cover and the lower cover have the same circumferential contour and are both circular, the upper cover and the lower cover are fastened through a mating action of the connecting member and the connection mating member to form a closed accommodating space, and the elastic member is arranged in the closed accommodating space.

Optionally, the upper cover includes a first through hole, the lower cover includes a second through hole, the elastic restoring assembly includes a central spindle, the first through hole and the second through hole are both circular holes with the same circumferential size and both adopt the central spindle as a symmetric axis, and the first through hole and the second through hole can be matched to form a through cavity running through the elastic restoring assembly.

Optionally, the fan lamp further includes a connecting assembly, the fan blade includes a blade and a base, the blade is connected with the upper cover through the base, the base includes a third through hole corresponding to the through cavity, the turntable includes a fastener corresponding to the through cavity, the fan blade, the elastic restoring assembly and the turntable are connected sequentially in an extension direction of the central spindle through a mating action of the connecting assembly, the third through hole, the through cavity and the fastener.

Optionally, the turntable includes a lower cover connecting seat corresponding to the lower cover, the lower cover connecting seat includes an eccentric occlusion member, the eccentric occlusion member is arranged eccentrically at the lower cover connecting seat, the lower cover includes a first mating member corresponding to the eccentric occlusion member, and the lower cover and the lower cover connecting seat can be engaged with each other through a mating action of the eccentric occlusion member and the first mating member.

Optionally, the base includes a connecting tenon, the connecting tenon includes tenon teeth protruding in a circumferential direction of the connecting tenon, the upper cover includes a mortise corresponding to the connecting tenon, the mortise includes tenon grooves corresponding to the tenon teeth, upon the connecting tenon being inserted into the tenon grooves, the blade can rotate with the upper cover through a mating action of the tenon teeth and the tenon grooves.

Optionally, the connecting assembly is a bolt assembly.

Optionally, the connecting tenon adopts the central spindle as a symmetric axis, and the third through hole runs through the connecting tenon.

Optionally, a plurality of tenon teeth protrude circumferentially from the connecting tenon.

Optionally, a circumferential size of at least one of the tenon teeth is different from circumferential sizes of other ones of the tenon teeth.

Optionally, the elastic member is a spring, the spring is coaxial with the upper cover and/or the lower cover, one end of the spring is connected with the upper cover, and the other end of the spring is connected with the lower cover.

Optionally, the circumferential contour of the turntable is circular, and a plurality of elastic restoring assemblies are distributed uniformly on a periphery of the turntable.

Optionally, the fan lamp further includes an illuminating module, the fan blades are arranged at an upturned side of the turntable, the illuminating module is connected with the turntable, and an optical axis of the illuminating module extends downward.

According to an example of the present disclosure, the upper cover and the lower cover are used to form a rotatable closed space, the elastic member is received in the closed space, and the fan blades are connected with the turntable through the upper cover and the lower cover, so that the possibility that the lubricating oil is thrown out in the utilization process of the fan can be reduced.

The above examples of the present disclosure focus on differences among the various examples. As long as different optimization features among the various examples are not contradictory, the examples can be combined to form a better example, which is not repeated here for brevity.

The above description is only examples of the present disclosure and is not used to limit the present disclosure. For those skilled in the art, various changes and variations of the present disclosure can be made. Any modifications, equivalent substitution and improvements made within the spirit and principle of the present disclosure shall be contained within the scope of claims of the present disclosure.

What is claimed is:

1. A fan lamp, comprising a turntable, an elastic restoring assembly and fan blades, wherein the fan blades are connected with the turntable through the elastic restoring assembly, the elastic restoring assembly comprises an upper cover, a lower cover and an elastic member, two ends of the elastic member are connected with the upper cover and the lower cover respectively, the upper cover can rotate relative to the lower cover and drives the elastic member to be deformed elastically, the fan blades are connected with the upper cover, and the turntable is connected with the lower cover;

the upper cover comprises a connecting member, the lower cover comprises a connection mating member, the upper cover and the lower cover have the same circumferential contour and are both circular, the upper cover and the lower cover are fastened through a mating action of the connecting member and the connection mating member to form a closed accommodating space, and the elastic member is arranged in the closed accommodating space; and the turntable comprises a lower cover connecting seat corresponding to the lower cover, the lower cover connecting seat comprises an eccentric occlusion member, the eccentric occlusion member is arranged eccentrically at the lower cover connecting seat, the lower cover comprises a first mating member corresponding to the eccentric occlusion member, and the lower cover and the lower cover connecting seat are configured to engage with each other through a mating action of the eccentric occlusion member and the first mating member.

2. The fan lamp according to claim 1, wherein the upper cover comprises a first through hole, the lower cover comprises a second through hole, the elastic restoring assembly comprises a central spindle, the first through hole and the second through hole are both circular holes with the same circumferential size and both adopt the central spindle as a symmetric axis, and the first through hole and the second through hole are configured to be matched to form a through cavity running through the elastic restoring assembly.

3. The fan lamp according to the claim 2, further comprising a connecting assembly, wherein the fan blade comprises a blade and a base, the blade is connected with the upper cover through the base, the base comprises a third through hole corresponding to the through cavity, the turntable comprises a fastener corresponding to the through cavity, the fan blade, the elastic restoring assembly and the turntable are connected sequentially in an extension direction of the central spindle through a mating action of the connecting assembly, the third through hole, the through cavity and the fastener.

4. The fan lamp according to claim 3, wherein the base comprises a connecting tenon, the connecting tenon comprises tenon teeth protruding in a circumferential direction of the connecting tenon, the upper cover comprises a mortise corresponding to the connecting tenon, the mortise comprises tenon grooves corresponding to the tenon teeth, upon the connecting tenon being inserted into the tenon grooves, the blade can rotate with the upper cover through a mating action of the tenon teeth and the tenon grooves.

5. The fan lamp according to claim 3, wherein the connecting assembly is a bolt assembly.

6. The fan lamp according to claim 4, wherein the connecting tenon adopts the central spindle as a symmetric axis, and the third through hole runs through the connecting tenon.

7. The fan lamp according to claim 4, wherein a plurality of tenon teeth protrude circumferentially from the connecting tenon.

8. The fan lamp according to claim 4, wherein a circumferential size of at least one of the tenon teeth is different from circumferential sizes of other ones of the tenon teeth.

9. The fan lamp according to claim 1, wherein the elastic member is a spring, the spring is coaxial with the upper cover and/or the lower cover, one end of the spring is connected with the upper cover, and the other end of the spring is connected with the lower cover.

10. The fan lamp according to claim 1, wherein the circumferential contour of the turntable is circular, and a plurality of elastic restoring assemblies are distributed uniformly on a periphery of the turntable.

11. The fan lamp according to claim 1, further comprising an illuminating module, wherein the fan blades are arranged at an upturned side of the turntable, the illuminating module is connected with the turntable, and an optical axis of the illuminating module extends downward.

12. A fan lamp, comprising:

an elastic restoring assembly comprising an upper cover, a lower cover and an elastic member; and a plurality of fan blades connected with a turntable through the elastic restoring assembly, wherein two ends of the elastic member are connected with the upper cover and the lower cover respectively, the upper cover is configured to rotate relative to the lower cover and drives the elastic member to be deformed elastically, the fan blades are connected with the upper cover, and the turntable is connected with the lower cover, wherein the turntable comprises a lower cover connecting seat corresponding to the lower cover, the lower cover connecting seat comprises an eccentric occlusion member, the eccentric occlusion member is arranged eccentrically at the lower cover connecting seat, the lower cover comprises a first mating member corresponding to the eccentric occlusion member, and the lower cover and the lower cover connecting seat are configured to engage with each other through a mating action of the eccentric occlusion member and the first mating member.

13. The fan lamp according to claim 12, wherein the upper cover comprises a first through hole, the lower cover comprises a second through hole, the elastic restoring assembly comprises a central spindle, the first through hole and the second through hole are both circular holes with the same circumferential size and both adopt the central spindle as a symmetric axis, and the first through hole and the second through hole are configured to be matched to form a through cavity running through the elastic restoring assembly.

14. The fan lamp according to the claim 13, further comprising a connecting assembly, wherein the fan blade comprises a blade and a base, the blade is connected with the upper cover through the base, the base comprises a third through hole corresponding to the through cavity, the turntable comprises a fastener corresponding to the through cavity, the fan blade, the elastic restoring assembly and the turntable are connected sequentially in an extension direction of the central spindle through a mating action of the connecting assembly, the third through hole, the through cavity and the fastener.

15. The fan lamp according to claim 14, wherein the base comprises a connecting tenon, the connecting tenon comprises tenon teeth protruding in a circumferential direction of the connecting tenon, the upper cover comprises a mortise corresponding to the connecting tenon, the mortise comprises tenon grooves corresponding to the tenon teeth, upon the connecting tenon being inserted into the tenon grooves, the blade can rotate with the upper cover through a mating action of the tenon teeth and the tenon grooves.

16. The fan lamp according to claim 15, wherein the connecting tenon adopts the central spindle as a symmetric axis, and the third through hole runs through the connecting tenon.

17. The fan lamp according to claim 15, wherein a plurality of tenon teeth protrude circumferentially from the connecting tenon, a circumferential size of at least one of the plurality of tenon teeth is different from circumferential sizes of other ones of the plurality of tenon teeth.

18. The fan lamp according to claim 12, wherein the elastic member is a spring, the spring is coaxial with the upper cover and/or the lower cover, one end of the spring is connected with the upper cover, and the other end of the spring is connected with the lower cover.

19. The fan lamp according to claim 12, wherein a circumferential contour of the turntable is circular, and a plurality of elastic restoring assemblies are distributed uniformly on a periphery of the turntable.

20. The fan lamp according to claim 12, further comprising an illuminating module, wherein the fan blades are arranged at an upturned side of the turntable, the illuminating module is connected with the turntable, and an optical axis of the illuminating module extends downward.

* * * * *